H. RICHARDSON.
CAR UNLOADER.
APPLICATION FILED AUG. 28, 1917.

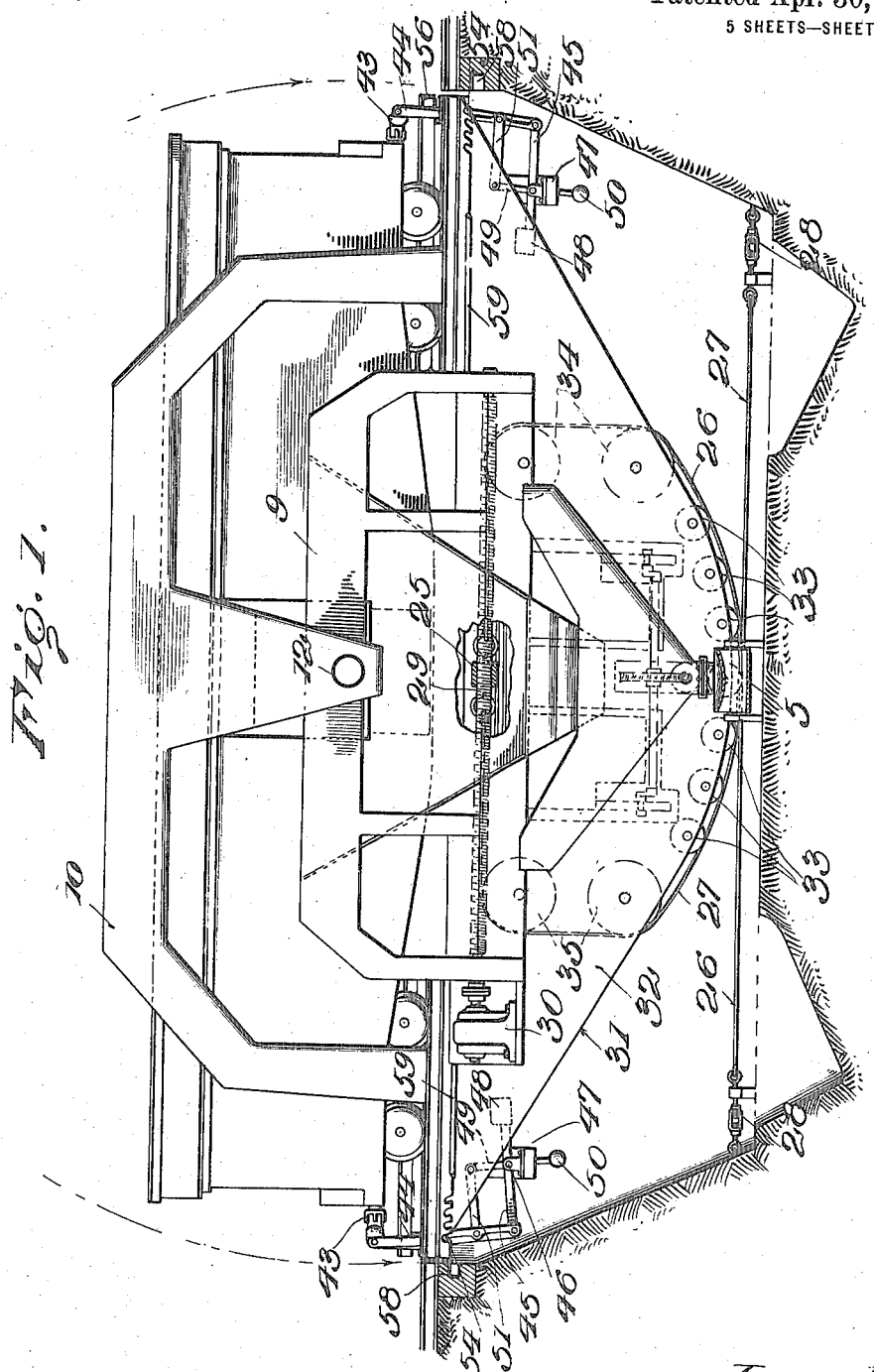

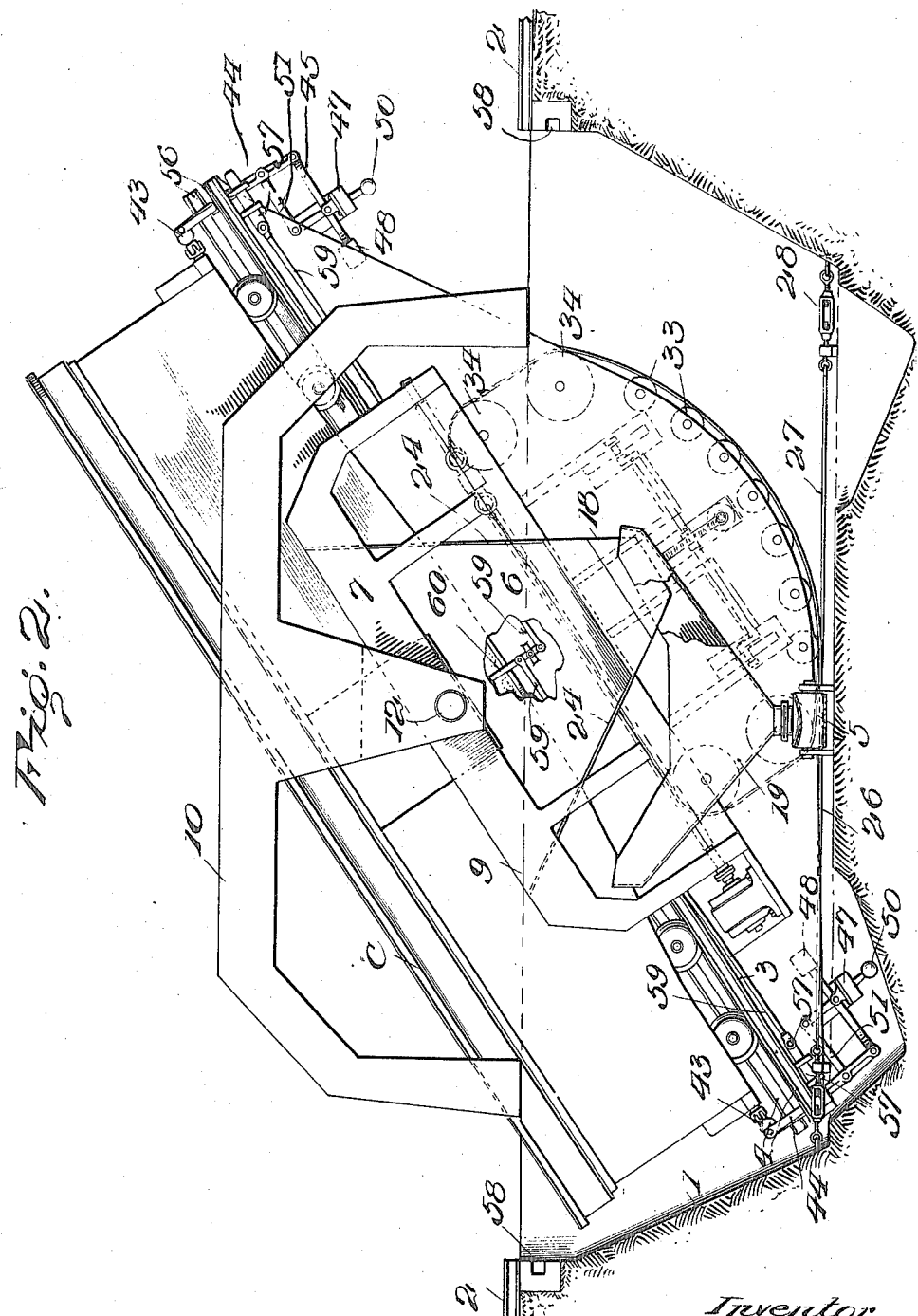

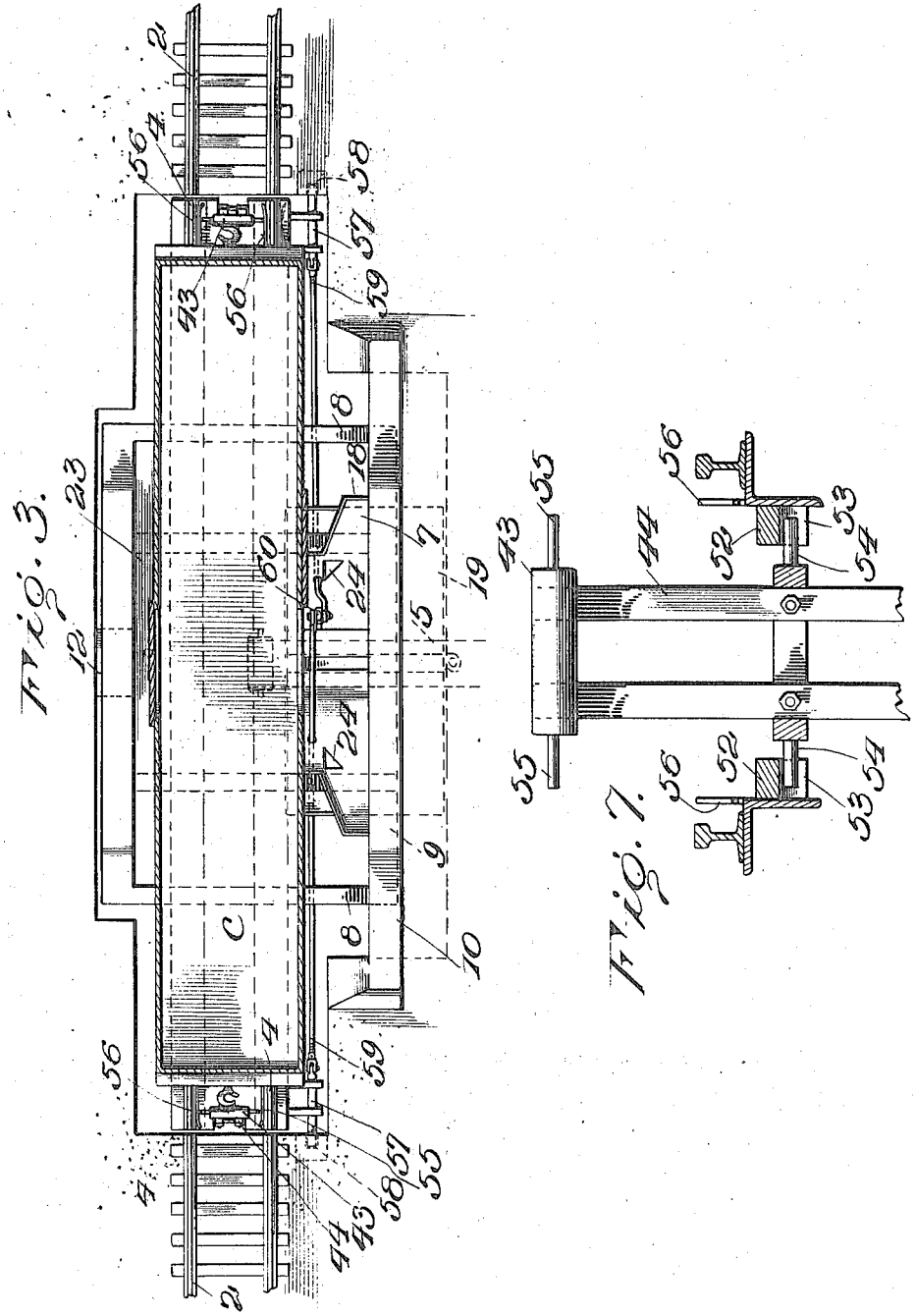

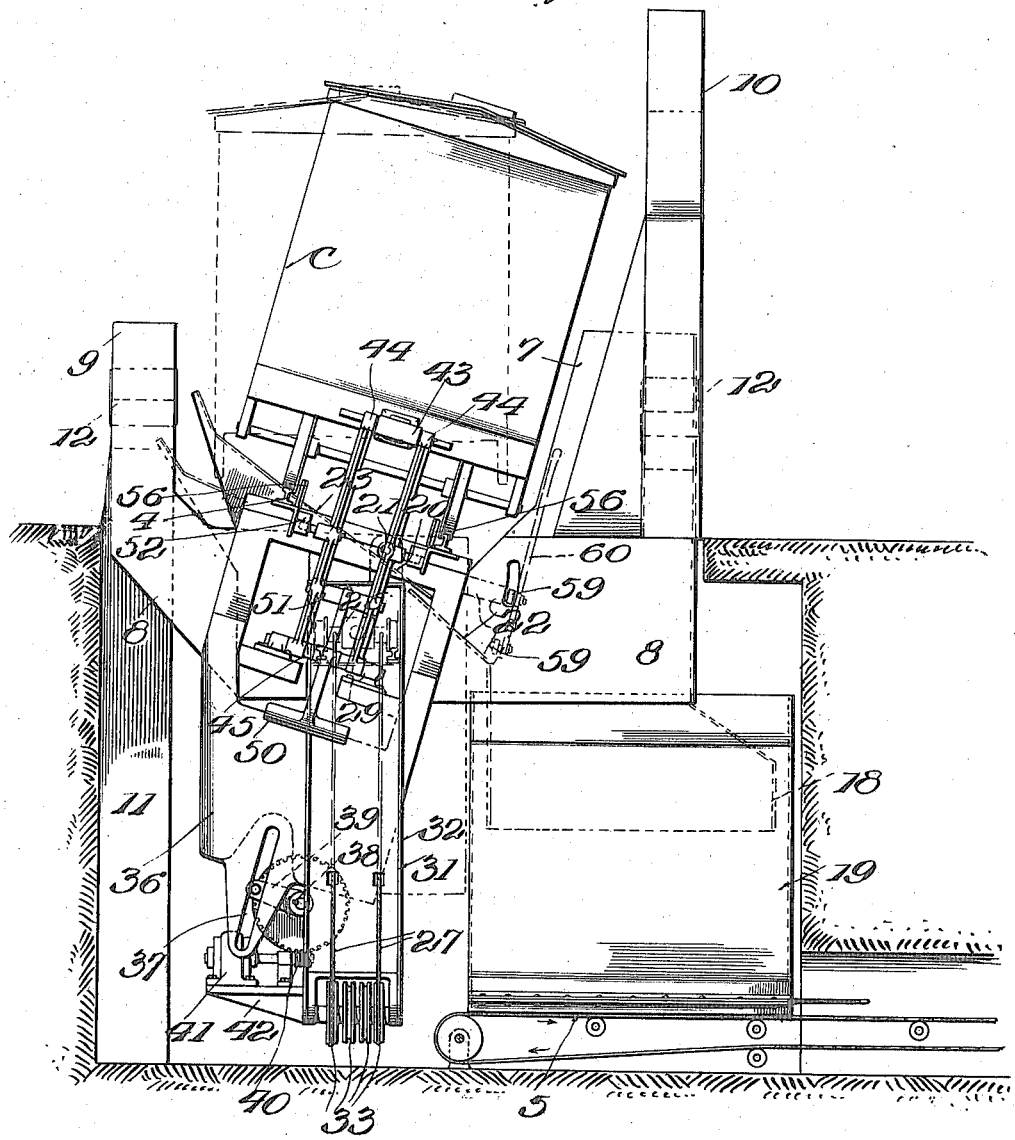

1,264,859.

Patented Apr. 30, 1918.
5 SHEETS—SHEET 5.

Witnesses

Inventor
Henry Richardson
BY,
James L. Norris,
Attorney.

UNITED STATES PATENT OFFICE.

HENRY RICHARDSON, OF PASSAIC, NEW JERSEY.

CAR-UNLOADER.

1,264,859.  Specification of Letters Patent.  Patented Apr. 30, 1918.

Application filed August 28, 1917. Serial No. 188,631.

*To all whom it may concern:*

Be it known that I, HENRY RICHARDSON, subject of the King of Great Britain, residing at Passaic, New Jersey, have invented certain new and useful Improvements in Car-Unloaders, of which the following is a specification.

This invention relates to improvements in car unloaders, proposing a construction of that type wherein the car is tilted, first in one direction and then in the other, about a transverse axis, to discharge its contents through the central door.

The principal objects of the invention are to provide a car unloader of the type stated which may be operated with greater facility, expedition and economy than existing constructions; and to avoid any loss of material.

A further object of the invention is to provide a car unloader of sturdy and simple construction.

With the above objects in view the invention consists in certain features of structure, combination and relation which will be set forth in detail as the description proceeds.

An embodiment of the invention is illustrated in the accompanying drawings, wherein:—

Figure 1 is a side elevation of a car unloader in which the features of the invention are incorporated.

Fig. 2 is a similar view showing the unloader as in operation.

Fig. 3 is a plan view.

Fig. 4 is an end elevation.

Figs. 5 and 6 are longitudinal and cross sectional views of a bearing for a tiltable cradle to be hereafter referred to.

Fig. 7 is a detail cross sectional view showing an end bumper.

Similar characters of reference designate corresponding parts throughout the several views.

Figure 6:
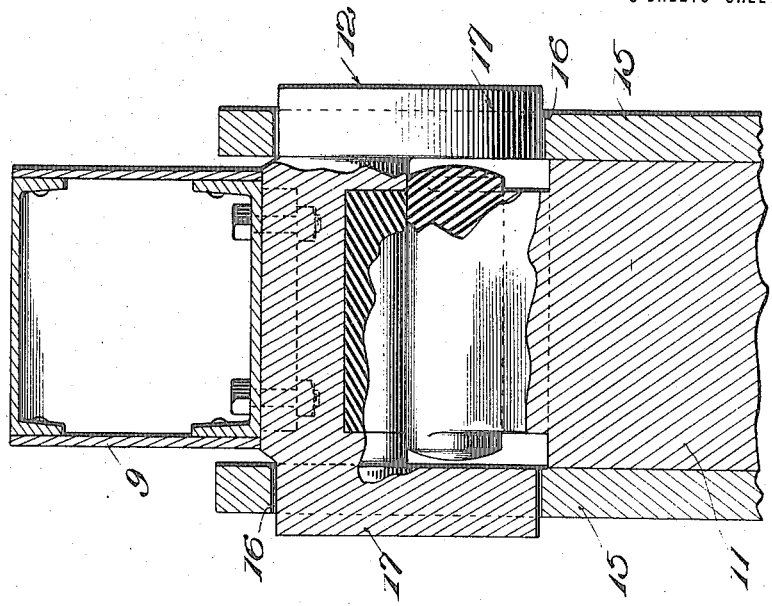
Figure 5:
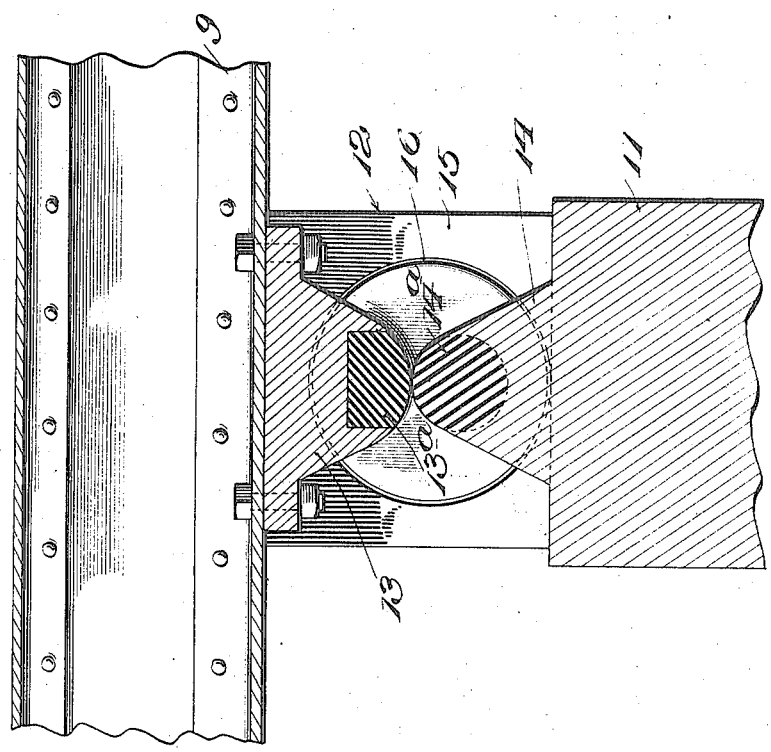

The working parts are located in a pit 1 which forms an interruption of the track 2, the space between the ends of the pit being normally bridged by a car platform 3 carrying rails 4 which, at times, coöperate with the track 2. The material which is discharged from the car is delivered to a conveyer 5 of any suitable construction and arrangement but which, as shown, operates adjacent the floor of the pit.

The platform 3 normally occupies a horizontal plane in which position a car to be unloaded may be moved upon said platform from either end of the pit. To effect the unloading of the car the platform is tiltable about a transverse axis. The car discharges into a hopper 6 supported adjacent said platform; and an important feature of the invention consists in the mounting of the hopper whereby it will move with the platform when the latter is tilted about a transverse axis. In this way the hopper may be made of very great capacity and its relation to the car will be constant from which it follows that the unloading operation is expedited and loss of material is avoided.

The platform 3 is an element of a car carrying means which in the embodiment disclosed also includes a cradle 7.

The cradle 7, which is preferably of skeleton construction has end bars 8 of generally U-shaped outline and pendent from its side bars 9.

For the support of said cradle an overhanging truss 10 is arranged adjacent the side of the pit toward which the material is discharged and a post 11 is arranged at the opposite side of the pit. Said truss and said post coöperate with the side bars 9 through the agency of bearings 12 which are preferably of the construction shown and which are arranged centrally of said side bars. Each bearing 12 includes a rocker element 13 secured to the side bar 9 and a stationary rocker element 14 secured to the support, *i. e.*, the truss 10 or post 11, as the case may be. The element 13 rocks on the element 14 and the faces of both elements are reversely curved through suitable arcs. It is preferred to include as parts of said elements wear blocks 13ª and 14ª respectively which are made of suitably hardened metal. Each support terminates in a pair of parallel plates 15 between which the elements 13 and 14 are arranged and said plates are formed with alining openings 16 in which are rotatably fitted disk shaped guides 17 carried by the rocking element 13.

The hopper 6 is fixedly secured to the cradle 7 at one side of the platform 3 and in the embodiment disclosed has a constantly open central discharge spout 18 which overhangs a stationary hopper 19 arranged in the pit 1 and in turn delivering the material to the conveyer 5. The platform 3, although participating in the tilting movement of the cradle, is itself tiltable on the cradle about a longitudinal axis. Thus the cradle is provided at suitable intervals with supporting bearings 20 for longitudinal pivots 21 carried by said platform.

The platform 3, as stated, normally occupies a horizontal position and after the car C has been positioned upon the platform the first operation of the machine is the tilting of the platform about its axis 21 into a laterally inclined position as shown in Fig. 4. This operation of the platform effects the tilting of the car from its normal position shown by broken lines in Fig. 4 to a laterally inclined position wherein it partly overhangs the hopper 6; and the car remains in this laterally inclined position throughout the operation of the unloader. This tilting of the car is instrumental in effecting an initial discharge through the open door of the car of a substantial percentage of the cargo, i. e., a third, more or less, into the hopper 6. Thereafter the unloading is completed in two major operations, i. e., a tilting of the cradle 7, and with it the car, first in one direction and then in the other. When the cradle is at the limit of its tilting movement in either direction material is discharged through the open door of the car from that end of the car which is uppermost. In this way the cargo is completely discharged by successively unloading both ends of the car. After the second or reverse tilting operation of the cradle the platform is restored to its normal position by first moving the cradle into normal position and thereafter moving the platform about its axis 21 into a horizontal plane. The empty car is then moved from the platform to a suitable location on the track 2.

The hopper 6 has its receiving end or mouth formed to provide a forwardly and downwardly inclined flange 22 which projects under the platform 3 (the latter being of skeleton construction) and prevents any material from falling between the platform and the body of the hopper 6, all the material which falls upon said flange being directed by it into the hopper. Where the material is of fine granular character, such for example, as grain there is apt to be a percentage of loss by leakage through loose seams adjacent the doors when the cargo is shifted or when one of the doors is forced open. To prevent loss from such leakage the platform 3 is provided with an apron 23 which is disposed transversely under the car and projects beyond the side of the car opposite to its delivery side. The apron 23 is arranged to form a functional continuation of the flange 22 when the platform is in its laterally inclined position, the forward or lower end of said apron preferably overlapping said flange. It will be obvious that any material which escapes through loose seams or cracks adjacent the closed door will fall upon the apron 23 by which and the flange 22 such material will be directed into the hopper 6.

The sides of the hopper preferably extend in converging relation to cause a certain concentration of the material as it flows through the spout 18. This is desirable in order that the material may be discharged without violence to itself or to the unloader and may have a substantially uniform rate of flow. If found necessary to counteract the lessening of the discharge angle (relatively to a horizontal plane) of either of the hopper sides when the cradle is tilted into either of its operative positions the sides of the hopper may, as shown, be each provided with a suitably proportioned and arranged supplemental material discharge opening 24; and when the hopper is tilted with the cradle, in either direction, material will flow simultaneously through the discharge spout 18 and through the opening 24 of the then lower side of the hopper into the stationary hopper 19.

The invention includes means for effecting the tilting movement of the car carrier to elevate either end of the car. Such means may be of any suitable construction and operation but it is preferably of the construction shown which consists essentially of a traveling head 25 connected at its opposite sides to cables 26 and 27 which extend in relatively opposite directions and have their ends secured, as at 28, adjacent opposite ends of the pit 1. The head 25 is movable lengthwise of the cradle and its movement in either direction will produce a tilting movement of the cradle. The head 25 is formed as a nut and is actuated by a threaded shaft 29 upon which it is fitted. Said shaft may be operated in any suitable manner but it is preferably directly operated by a reversible electric motor 30 located adjacent one end of the cradle. The cradle is provided with a pendent longitudinally disposed skeleton frame 31 which is utilized as a support for various elements of the unloader and includes side beams 32. The cables 26 and 27 are trained over a group of small sheaves 33 arranged along an arc and over larger sheaves 34 and 35 respectively, of which a pair, one located above the other are arranged adjacent the respective ends of the group of sheaves 33, the pintles of all of said sheaves being supported by the beams 32. The larger sheaves 34 and 35 are provided in order to secure easy bending moments of the cables as their direction abruptly changes. It is preferred to provide a pair of cables 26 and a pair of cables 27 and to arrange the cables of each pair at equal distances from the center of the head 25. Pursuant to this arrangement, one pair of cables will operate between the cables of the other pair (*e. g.*, the cables 26 will operate between the cables 27).

Thus (Fig. 2 of the drawing being considered) the cables 26 are connected to the left end of the pit and extend from their connections 28 toward the right, passing over the sheaves 33 provided therefor and at the right end of said group of sheaves being led upward and over the sheaves 34 from the upper of which they are led inward or to the left to the head 25. In like manner the cables 27 extend from their connections 28 at the right end of the pit toward the left, passing over the sheaves 33 provided therefor and at the left end of said group of sheaves being led upward and over the sheaves 35 from the upper of which they are led inward or to the right to the head 25. It will be manifest that when the head 25 is moved to the right the cables 27 will be instrumental in tilting the cradle to bring the right end of the car uppermost and that when the head 26 is moved to the left the cables 26 will be instrumental in tilting the cradle in the opposite direction to bring the left end of the car uppermost.

The invention includes means for tilting the platform 3 about its axis 21. As shown and preferred this means comprises arms 36 rigid with said platform and depending therefrom, said arms having vertical slots 37 at their lower ends and a rotatable longitudinally disposed shaft 38 journaled in bearings secured to the frame 31 and provided with crank arms 39 having wrist pins which operate in said slots. The shaft 38 is preferably driven by worm reduction gearing 40 from an electric motor 41 supported on a bracket 42 secured to the frame 31.

For the purpose of holding the car against endwise movement on the platform 3 movable end bumpers are provided. The end bumpers and their appurtenant mechanism may be of any suitable construction but they are preferably of the construction shown. Each end bumper 43 is mounted upon one or a pair of upright arms 44 which at their lower ends are pivoted to a supporting lever 45. The lever 45 is pivoted between its ends as at 46 to a bracket 47 supported from and below the platform 3 and at its inner end carries a counter-balance weight 48. By virtue of their connection to the lever 45 the bumper carrying arms may be moved in fore and aft directions and by virtue of the pivotal mounting of the lever 45 said arms may also be raised or lowered. In order to hold the arms 44 in operative position an upright lever 49 is also connected by the pivot 46 to the bracket 47, said lever having a counter-balance weight 50 below its pivot and the upper end of the lever 49 is connected by a link 51 to the arms 44 above their connection with the lever 45. By virtue of the lever system described the positions of the bumpers 43 may be adjusted in accordance with variations in the lengths of the different cars for which the unloader may be used; and in order to hold said bumpers against movement from any positions at which they may be set longitudinal bars 52 secured to the platform 3 and having a series of notches 53 opening to their lower faces are provided for coöperation with pins 54 projecting laterally from the arm or arms 44. The pins 54 engage in the notches 53 in accordance with the positions in which the bumpers are set and hold the arms 44 and with them the bumpers against upward and fore and aft movement. The tendency of the weight 48 is to raise the bumpers and in order that the bumpers may normally be held in a lowered position wherein they will offer no obstruction to the movement of the car upon the platform said bumpers are provided with laterally projecting pins 55 for engagement in hooks 56 secured to the platform 3.

In the embodiment disclosed the bumpers are operated manually. Assuming that they are to be operated to engage the car, the attendant first manipulates them, by a downward and inward movement, to disengage the pins 55 from the hooks 56 after which he permits their upward movement, as effected by the weight 48, guiding them however into a position wherein they will engage the coupling member at the adjacent end of the car. As the bumpers thus move upward into operative position the pins 54 engage in the notches 53 whose location accords with the necessary position of the bumpers. In order to release the car the bumpers are depressed and manipulated to effect the engagement of the pins 55 in the hooks 56.

The head 25 and the shaft 29 upon which said head operates are effective to normally hold the cradle 7 against tilting movement but instead of relying on these elements for such purpose it is desirable to employ a suitable locking device, preferably consisting of latch arms 57 guided adjacent the ends of the platform 3 and engageable in keepers 58 provided in the end walls of the pit, the said arms being connected by links 59 to a suitably located upright operating lever 60 by which said arms may be engaged in or withdrawn from said keepers.

Having fully described my invention I claim:—

1. In a car unloader, a car carrier tiltable about a transverse axis; and an unloading hopper located at one side of and tiltable with said carrier, the car, when positioned on said carrier, discharging its contents into said hopper.

2. In a car unloader, a car carrier tiltable in either direction about a central transverse axis and including a car platform tiltable about a longitudinal axis; and an unloading hopper located adjacent one side of said platform and tiltable with said carrier and into which the car, when positioned on said platform, discharges its contents.

3. In a car unloader, a car carrier comprising a cradle tiltable about a central transverse axis and a car platform supported by said cradle for participation in the tilting movement thereof; and an unloading hopper supported by said cradle adjacent one side of said platform for participation in the tilting movement of said cradle, the car, when positioned on said platform discharging its contents into said hopper.

4. In a car unloader, a car carrier comprising a cradle tiltable about a central transverse axis and a car platform supported by said cradle for participation in the tilting movement thereof, said platform being itself tiltable about a longitudinal axis; and an unloading hopper supported by said cradle adjacent one side of said platform for participation in the tilting movement of said cradle, the car when positioned on said platform discharging its contents into said hopper.

5. In a car unloader, a car carrier tiltable about a central transverse axis; and an unloading hopper located at one side of and tiltable with said carrier, the car, when positioned on said carrier, discharging its contents into said hopper, said hopper having converging sides provided with material discharge openings.

6. In a car unloader, a car carrier comprising a cradle tiltable about a central transverse axis, and a car platform supported by said cradle for participation in the tilting movement thereof, said platform being itself tiltable about a longitudinal axis; an unloading hopper supported by said cradle adjacent one side of said platform for participation in the tilting movement of said cradle, the car when positioned on said platform discharging its contents into said hopper; and an apron carried by said platform and disposed under the car, said apron when the platform is tilted into a laterally inclined position, being inclined toward said hopper to feed thereto any material escaping by leakage from the car.

7. In a car unloader, a car carrier including a cradle and a car platform mounted thereon; an unloading hopper mounted on the cradle adjacent one side of said platform; the cradle having side bars located beyond the platform and the hopper; bearings associated with the central portions of said side bars to provide pivotal support for the cradle whereby the latter and with it the platform and the hopper may tilt about a central transverse axis; and means for applying power at either end of the cradle to effect the tilting thereof.

8. In a car unloader, a car carrier including a cradle tiltable about a central transverse axis, and means for tilting said cradle including a head movable in either direction lengthwise of said cradle, a system of oppositely directed cables connected to said head and having fixed oppositely located connections at their ends remote from said head; guide sheaves for said cables, and a frame depending from said cradle and carrying said guide sheaves.

9. In a car unloader, a car carrier including a cradle tiltable about a central transverse axis, and means for tilting said cradle including a rotatable threaded longitudinal shaft supported by the cradle, a head formed as a nut and mounted on said shaft for movement in either direction and a system of anchored cables connected to said head.

10. In a car unloader, a car carrier including a cradle tiltable about a central transverse axis and means for tilting said cradle including a head movable in either direction lengthwise of said cradle and a system of anchored cables connected to said head.

11. In a car unloader, a car carrier including a cradle tiltable about a central transverse axis and a car platform supported on said cradle and tiltable about a longitudinal axis; and means for tilting said platform comprising an arm carried by said platform and formed with a slot and a rotatable shaft carried by said cradle and having a crank arm provided with a wrist pin operating in said slot.

In testimony whereof I have hereunto set my hand in presence of two subscribing witnesses.

HENRY RICHARDSON.

Witnesses:
   C. P. CLARK,
   T. I. E. GODFREY.